United States Patent [19]
Minamizaki et al.

[11] Patent Number: 6,103,302
[45] Date of Patent: Aug. 15, 2000

[54] METHOD FOR MODIFICATION OF SURFACE OF PRESSURE-SENSITIVE ADHESIVE WITH FUNCTIONAL GROUP

[75] Inventors: Yoshihiro Minamizaki; Hajime Tsuchiya; Yasuhiro Umemoto; Toshiyasu Okui, all of Osaka, Japan

[73] Assignee: Nitto Denko Corporation, Osaka, Japan

[21] Appl. No.: 09/194,183

[22] PCT Filed: May 27, 1997

[86] PCT No.: PCT/JP97/01796

§ 371 Date: Nov. 24, 1998

§ 102(e) Date: Nov. 24, 1998

[87] PCT Pub. No.: WO97/45501

PCT Pub. Date: Dec. 4, 1997

[30] Foreign Application Priority Data

May 29, 1996 [JP] Japan ................................. 8-135066
Oct. 31, 1996 [JP] Japan ................................. 8-289563

[51] Int. Cl.[7] .................................................... B05D 5/10
[52] U.S. Cl. ...................... 427/208.8; 427/333; 427/340; 427/430.1
[58] Field of Search ............................. 427/208.8, 333, 427/340, 430.1

[56] References Cited

FOREIGN PATENT DOCUMENTS

| 58-13114 | 3/1983 | Japan | ................................. C09J 7/02 |
| 61-16289 | 4/1986 | Japan | ................................. C08J 7/12 |
| 3-26714 | 4/1991 | Japan | ................................. C09J 7/02 |
| 06346033 | 12/1994 | Japan . | |

*Primary Examiner*—Bernard Pianalto
*Attorney, Agent, or Firm*—Sughrue, Mion, Zinn, Macpeak & Seas, PLLC

[57] ABSTRACT

A modification method of functional group on the surface of a pressure-sensitive adhesive by fixing a functional group to the surface of the pressure-sensitive adhesive by an interfacial contact reaction between the pressure-sensitive adhesive phase and the phase containing a functional group-containing compound.

By the modification method, a functional group effective for the improvement and control of an adhesive property can stably be introduced at high density to the surface of the pressure-sensitive adhesive.

6 Claims, 6 Drawing Sheets

0.1μm 0.1μm

METHOD FOR MODIFICATION OF SURFACE OF PRESSURE-SENSITIVE ADHESIVE WITH FUNCTIONAL GROUP

TECHNICAL FIELD

The present invention relates to a modification method of functional group on a pressure-sensitive adhesive surface, capable of stably introducing at high density functional group(s) effective for the improvement and control of an adhesive property to the surface of a pressure-sensitive adhesive.

BACKGROUND ART

A pressure-sensitive adhesive is widely used for adhesion to the surfaces of various adherends such as metals, glasses, woods, papers, corrugated boards, plastic materials, etc. Specific examples of a pressure-sensitive adhesive include acrylic pressure-sensitive adhesives each made up of a polymer mainly comprising an acrylic monomer such as butyl acrylate, 2-ethylhexyl acrylate, etc., as the base polymer, and rubber-based pressure-sensitive adhesives each made up of rubber-based polymer such as a natural rubber, a styrene-isoprene-styrene block polymer, etc., as the base polymer.

In these pressure-sensitive adhesives, to increase the adhesive strength to a specific adherend, it has been performed to introduce therein a functional group such as a carboxyl group, an amino group, etc. For example, in the acrylic pressure-sensitive adhesive, a functional group- containing monomer copolymerizable with a main monomer such as acrylic acid, dimethylaminoethyl methacrylate, etc., is copolymerized and in the rubber-based pressure-sensitive adhesive, an additive such as a tackifier resin having a functional group is used or a functional monomer is grafted onto the rubber molecular chain.

Contrary to this, to weaken the adhesive strength of a pressure-sensitive adhesive to an adherend to impart a releasing property to the adhesive, a monomer having a non-adhesive functional group such as a long-chain alkyl group is copolymerized with or grafted to the adhesive, or an additive having a non-adhesive functional group is compounded with the adhesive. Further, as a modification method of functional group on a pressure-sensitive adhesive surface for increasing or weakening the adhesive strength to an adherend, a method of coating a diluted solution of a function group-containing compound on the surface of a pressure-sensitive adhesive is known.

However, the above-described conventional techniques have the fault that the modification of functional group on the pressure-sensitive adhesive surface is hard to carry out sufficiently. This is because even when the functional group is introduced into the phase of the pressure-sensitive adhesive, it frequently happens that because of the insufficient concentration of the function group at the surface of the pressure-sensitive adhesive, the sufficient effect cannot be obtained, or the molecular chain segment containing the functional group causes a phase separation, whereby the functional group does not uniformly exist at the surface of the pressure-sensitive adhesive. Also, particularly, in the case of a polar functional group such as an amino group and a carboxyl group, the functional group is hard to exist at the surface of the pressure-sensitive adhesive and there is a tendency that the functional group diffused in the inside of the pressure-sensitive adhesive with the passage of time to lower the concentration of the functional group at the surface of the pressure-sensitive adhesive.

When a too much amount of the functional group is introduced in to the pressure-sensitive adhesive to overcome these faults and increase the concentration of the functional group at the surface of the pressure-sensitive adhesive, there is a possibility of hindering the flow characteristics and the adhesive characteristics of the pressure-sensitive adhesive. Also, in such a case, a problem of staining the surface of an adherend, to which the pressure-sensitive adhesive is adhered, with a functional group-containing additive bled out onto the surface of the pressure-sensitive adhesive is liable to occur.

Also, in the method of coating a diluted solution of a functional group-containing compound on the surface of the pressure-sensitive adhesive, by evaporating off the solvent after coating, a thin layer of the functional group-containing compound is formed on the surface of the pressure-sensitive adhesive but in this case, the functional group-containing compound is repelled to form uneven coating and the solvent dissolving the functional group-containing compound dissolves or swells the surface of the pressure-sensitive adhesive, whereby the thin layer of the functional group-containing compound sometimes cannot be formed well.

Furthermore, according to the above-described coating method of a diluted solution, the fixed strength of the functional group-containing compound is liable to become insufficient, whereby the thin layer of the functional group-containing compound is liable to be damaged by friction, etc. In addition, as a general functional group-modificaton method in other fields than the pressure-sensitive adhesive field, a modificaton method of functional group on surfaces used for modifying the surfaces of plastic films, such as a corona discharging treatment, a plasma treatment, a radiation treatment, a photo-graft polymerization, etc., are known, the methods of this kind are not so effective for a soft composition such as a pressure-sensitive adhesive.

An object of the present invention is to overcome these problems in the conventional techniques and to provide a modification method of functional group on a pressure-sensitive adhesive surface capable of safely introducing at high density functional group(s) effective for the improvement and the control of a pressure-sensitive adhesive property to the surface of a pressure-sensitive adhesive.

DISCLOSURE OF THE INVENTION

As a result of various investigations for achieving the above- described object, the present inventors have found that when a functional group is fixed to the surface of a pressure-sensitive adhesive by causing an interfacial contact reaction between a pressure-sensitive adhesive phase and a phase containing a functional group-containing compound, the occurrence of the faults shown in the conventional techniques is avoided, the desired functional group can be safely introduced at high density to the surface of the pressure-sensitive adhesive as well as at the introduction of the functional group, the problems that the fluid characteristics and the adhesive characteristics of the pressure-sensitive adhesive are reduced and the surface of the adherend is stained by the bleeding out and the transfer of the compound do not occur, and also because the fixed strength of the functional group to the surface of the pressure-sensitive adhesive is large, the problem that the above-described functional group is easily released by a friction, etc., does not occur, and the present invention has been accomplished based on this finding.

That is, the present invention is a modification method of functional group on the pressure-sensitive adhesive surface, which comprises subjecting the pressure-sensitive adhesive surface containing a compound having a reactive functional group and a functional group-containing compound having a reactive functional group which is reactive to the reactive functional group to an interfacial contact reaction in the state that the reactive functional group of the pressure-sensitive adhesive surface has reaction activity, thereby fixing a functional group-modified phase having a thickness of 1,000 nm or less, and that the above-described functional group-containing compound is at least one kind of polyethyleneimine, polyallylamine, polyvinylamine, and polyacrylic acid.

Furthermore, the present invention can provide a functional group-modification method of the surface of a pressure-sensitive adhesive wherein after fixing the functional group to the surface of the pressure-sensitive adhesive by such an interfacial contact reaction, other functional group-containing compound is further subjected to an interfacial contact reaction with the functional group to fix other functional group to the functional group fixed to the surface of the pressure-sensitive adhesive.

The pressure-sensitive adhesive containing a compound having a reactive functional group (hereinafter simply referred to as "pressure-sensitive-adhesive") in the present invention includes any known pressure-sensitive adhesives such as acrylic pressure-sensitive adhesives, rubber-based pressure-sensitive adhesives, etc. The pressure-sensitive adhesives can appropriately mix tackifier resins such as rosin-based tackifiers, terpene-based tackifiers, styrene-based tackifiers, aliphatic petroleum-based tackifiers, aromatic petroleum-tackifiers, xylene-based tackifiers, phenol-based tackifiers, coumarone-indene-based tackifiers, the hydrogenated products thereof, etc.; softeners such as liquid resins, liquid rubbers, polybutene, process oils, dioctyl phthalate, etc.; and other additives such as antioxidants, fillers, pigments, crosslinking agents, etc.

The acrylic pressure-sensitive adhesve comprises a copolymer of a monomer mixture made up of butyl acrylate, 2-ethylhexyl acrylate, isooctyl acrylate, isononyl acrylate, ethyl acrylate, etc., as the main monomer added with a modifying monomer such as acrylonitrile, vinyl acetate, styrene, methyl methacrylate, acrylic acid, maleic anhydride, vinylpyrrolidone, glycidyl methacrylate, dimethylaminoethyl methacrylate, hydroxyethyl acrylate, acrylamide, etc., as the base polymer.

The rubber-based pressure-sensitive adhesive comprises a rubber-based polymer such as a natural rubber, a styrene-isoprene-styrene block copolymer, a styrene-butadiene-styrene block copolymer, a styrene-ethylene-butylene-styrene block copolymer, a styrenebutadiene rubber, polybutadiene, polyisoprene, polyisobutylene, a butyl rubber, a chloroprene rubber, a silicone rubber, etc., as the base polymer.

In the present invention, the pressure-sensitive adhesive layer is formed in the form of a pressure-sensitive adhesive tape, a pressure-sensitive adhesive sheet, a pressure-sensitive adhesive label, etc. For example, the pressure-sensitive adhesive layer is formed, after coating the above-described pressure-sensitive adhesive on a substrate such as a plastic film, a paper, a cloth, a metal foil, a separator, etc., as a solution or an aqueous dispersion thereof, the solvent or water is removed by drying or is formed by using a means such as hot melt coating or calender coating. Also, after coating monomers or an oligomer for forming a pressure-sensitive adhesive on a substrate, the coated layer is photopolymerized by the irradiation with ultraviolet rays to form the pressure-sensitive adhesive layer.

The modification method of functional group on the pressure-sensitive adhesive surface of the present invention is usually applied to the above-described pressure-sensitive adhesive layers and as a specific embodiment, by carrying out the interfacial contact reaction between the solid phase or liquid phase made up of the above-described pressure-sensitive adhesive layer and the liquid phase or gaseous phase containing the functional group-containing compound, fixing of the functional group to the surface of the pressure-sensitive adhesive is carried out.

Now, when the compound having the reactive functional group contained in the pressure-sensitive adhesive phase is allowed to stand for a long period of time after forming the pressure-sensitive adhesive layer in the form of, for example, a pressure-sensitive tape, the above-described reactive functional group reacts with water in air or with other components in the pressure-sensitive adhesive layer, thereby the reactive functional group is vanished to lose the reactivity (deactivated). The period that the reactive functional group becomes deactivation differs according to the kind of the functional group but is usually from about one day to 3 months. For example, when the functional group is an isocyanate group or a carbonyl chloride group, the functional group is deactivated in a relatively early period of from about 2 to 20 days.

Accordingly, the interfacial contact reaction in the present invention means that the reactive functional group contained in the pressure-sensitive adhesive phase is reacted with a functional group-containing compound having other reactive functional group by the interfacial contact with the compound in the state of having a reactivity in the surface thereof (that is, in the state that the reactive functional group contained in the pressure-sensitive adhesive phase is not deactivated).

In this case, the liquid phase containing the functional group-containing compound is subjected to the interfacial contact reaction, it is preferred to carry out the reaction by dipping or immersing but after coating the liquid phase by a kiss coater, a roll coater, a squeeze coater, a spin coater, etc., the excessively coated matter may be removed by washing. Also, the gaseous phase containing the functional group-containing compound is subjected to the interfacial contact reaction, the reaction may be carried out by placing the pressure-sensitive adhesive phase (a solid phase or a liquid phase) in a chamber in which the functional group-containing compound exists as the gas thereof.

To introduce at high density the functional group to the surface of the pressure-sensitive adhesive by these methods, it is undesirable that in the case of carrying out the above-described interfacial contact reaction, the surface of the pressure-sensitive adhesive is dissolved or largely swelled. Thus, in the liquid phase containing the functional group-containing compound, it is desirable to select a proper solvent and also in the gaseous phase containing the functional group-containing compound, it is desirable to select a proper one as the gas (functional group-containing compound).

In the present invention, by subjecting the pressure-sensitive adhesive surface containing a compound having a reactive functional group and a functional group-containing compound having a reactive functional group which is reactive to the reactive functional group to an interfacial contact reaction in the state that the reactive functional group of the pressure-sensitive adhesive surface has reaction activity, the surface of the pressure-sensitive adhesive and the functional group-containing compound become a strongly bonded state by a chemical bond such as a covalent bond, a coordinate bond, an ionic bond, a metallic bond, etc.

It is preferred that such an interfacial contact reaction proceeds in a short time. From this view point, as examples of the preferred combination of the reactive functional group of the pressure-sensitive adhesive phase and the reactive functional group of the phase containing the functional group-containing compound for carrying out the interfacial contact reaction, there are a reaction between a primary or secondary amino group and an isocyanate group, an acid chloride group, an epoxy group, or an acid anhydride group; a reaction between a carboxyl group and an aziridine group; a reaction between a hydrosilyl group and a hydroxy group or a vinyl group; a reaction between an epoxy group and an acid anhydride group; and a reaction between an acid chloride group and a hydroxy group or a mercapto group.

To incorporate the compound having a reactive functional group in the pressure-sensitive adhesive phase for carrying out such an interfacial contact reaction, one or more reactive functional groups are bonded to one molecule of the base polymer of the pressure-sensitive adhesive by a copolymerization, a graft reaction, a side-chain denaturing reaction, etc., or the compound having the reactive functional group as described above may be added to the pressure-sensitive adhesive. Also, the thin layer of the compound having the reactive functional group as described above may be formed on the surface of the pressure-sensitive adhesive by a coating method of a diluted solution or a coating method such as a squeeze coating method, a spin coating method, etc.

On the other hand, the functional group-containing compound which reacts with the above-described reactive functional group contained in the pressure-sensitive adhesive may be a compound having at least one reactive functional group which reacts with the reactive functional group contained in the pressure-sensitive adhesive in one molecule, and the reactive functional group for forming a bond to the surface of the pressure-sensitive adhesive may be same as or different from the functional group which is intended to be finally introduced to the surface of the pressure-sensitive adhesive. In addition, particularly preferred examples of the functional group-containing compound include polyethyleneimine, polyallylamine, polyvinylamine, and polyacrylic acid.

In the present invention, it is better that the thickness of the functional group modifying phase formed on the surface of the pressure-sensitive adhesive as described above is usually 1,000 nm or less, and preferably 100 nm or less. If the thickness of the functional group modifying phase becomes too large, it undesirably hinders the flowability and the adhesive characteristics of the pressure-sensitive adhesive.

Also, in the present invention, other functional group can be further introduced to the surface of the pressure-sensitive adhesive by causing the interfacial contact reaction of other functional group-containing compound with the functional group fixed to the surface of the pressure-sensitive adhesive by utilizing the reactivity of the latter functional group. For example, when the functional group fixed to the surface of the pressure-sensitive adhesive is a primary or secondary amine having a high reactivity (that is, when above-described polyethyleneimine, polyallylamine, polyvinylamine, etc., is used as the functional group-containing compound), by causing the interfacial contact reaction of the amino group with a function group-containing compound having an alkoxysilyl group, a vinyl group, a polydimethylsiloxane group, a long chain alkyl group, etc., as other functional group together with a functional group such as an epoxy group, an acid chloride group, an isocyanate group, etc., which reacts with the amino group, it is possible to increase the adhesive strength according to the kind of the adherend or impart a releasing property (lightly releasing property).

BEST MODE FOR CARRYING OUT THE INVENTION

Figure 1:
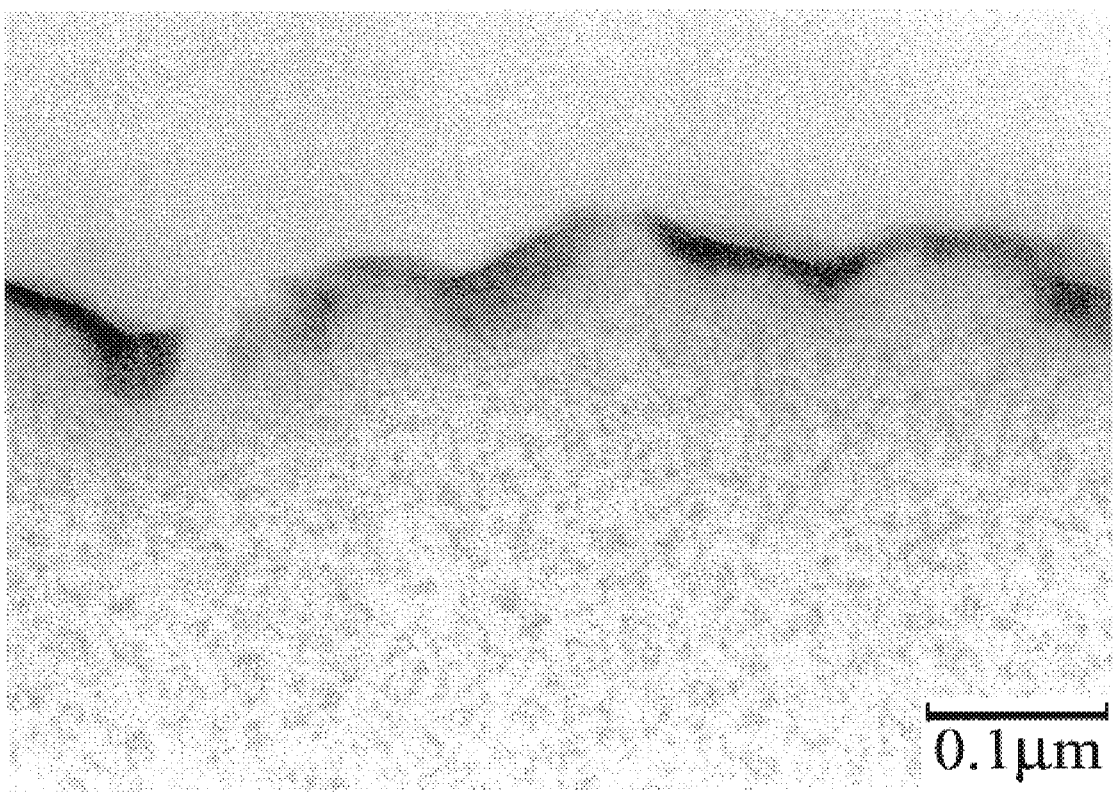
FIG. 1 is a photograph (250,000 magnifications) by TEM showing the sectional structure of the portion near the surface of the pressure-sensitive adhesive layer of the pressure-sensitive tape of Example 1.

Next, the present invention is described in more practically by the following examples. All parts in these examples, unless otherwise indicated, are by weight. Also, the acrylic pressure-sensitive adhesive solution and the SIS-based pressure-sensitive adhesive solution (the pressure-sensitive adhesive solution using a styrene-isoprene-styrene block copolymer) are prepared by the following methods.

<Acrylic pressure-sensitive adhesive solution>

In a 1,000 ml four-necked flask equipped with a stirrer, a thermometer, a nitrogen gas inlet pipe, a condenser, and dropping funnel were placed 190 g of butyl acrylate, 10 g of acrylic acid, 0.4 g of azobisisobutyronitrile as a polymerization initiator, and 300.6 g of ethyl acetate as a solvent, while gently stirring the mixture, a nitrogen gas was introduced into the flask, and the liquid temperature in the flask was raised to 60° C. After few minutes since then, the generation of heat began and thus by controlling the temperature of the outer bath of the flask, the liquid temperature in the flask was kept at 60° C.

Because after about 3 hours since the initiation of the polymerization, the viscosity of the liquid began to increase, 83.5 g of ethyl acetate was added dropwise into the flask and then the polymerization was further continued for about 3 hours. Thereafter, after further adding dropwise 83.3 g of ethyl acetate into the flask, the liquid temperature in the flask was raised to 80° C. and the polymerization was continued for 2 hours to prepare an acrylic pressure-sensitive adhesive solution having a solid content of 30% by weight. In the measurement by GPC (gel permeation chromatography), the weight average molecular weight of the produced polymer by polystyrene conversion was 1,300,000.

<SIS-based pressure-sensitive adhesive solution>

In a 500 ml beaker were placed 100 g of a SIS block copolymer (SIS Quintack 3421, trade name, made by Nippon Zeon Co., Ltd.), 50 g of terpene-based tackifier resin (YS Resin Px1150, trade name, made by Yasuhara Yushi Kogyo K.K.), and 150 g of toluene and the copolymer and the resin were dissolved in the solvent to prepare an SIS-based pressure-sensitive adhesive solution having a solid content of 50% by weight.

REFERENCE EXAMPLE 1

With the acrylic pressure-sensitive adhesive solution was mixed a tri-functional isocyanate compound [Coronate L (the ethyl acetate solution of the addition reaction product of 1 mol of trimethylolpropane and 3 mols of 2,4-tolylene diisocyanate having a solid content of 75% by weight), trade name, made by Nippon Polyurethane Industry Co., Ltd.] such that the solid content thereof became 3 parts per 100 parts of the solid content of the pressure-sensitive adhesive solution. The mixture was coated on a polyester film of 25. m in thickness by an applicator at a dry thickness of 40. m and dried in a drier by a hot blast of 70° C. for 5 minuets to evaporate off the solvent and to prepare a pressure-sensitive tape. The pressure-sensitive tape was allowed to stand at room temperature such that the surface of the pressure-sensitive adhesive layer did not touch other substances.

It was confirmed by the measurement of the infrared absorption with the passage of time that when the pressure-sensitive tape thus prepared was allowed to stand for 4 days at room temperature, the isocyanate group in the pressure-sensitive adhesive caused to react the carboxyl group and water contained in the pressure-sensitive adhesive and also the cyclization reaction (polymer-forming reaction) of the isocyanate group itself occurred, whereby the isocyanate group was spontaneously vanished and deactivated.

EXAMPLE 1

The pressure-sensitive tape obtained in Reference Example 1 was immersed in an aqueous solution containing 0.2 g of polyethyleneimine [Epomin P-1000, trade name, made by Nippon Shokubai Co., Ltd., (molecular weight: 70,000)] in 1,000 ml of water before the isocyanate group in the pressure-sensitive adhesive was not deactivated (within 6 hours) and thereafter the pressure-sensitive tape was pulled up in the perpendicular direction at a speed of 40 cm/minute. After drying off water attached to the pressure-sensitive tape, the tape was allowed to stand at room temperature such that the surface of the pressure-sensitive adhesive layer did not tough other substances. Thus, a functional group-modification on the surface of the pressure-sensitive adhesive was conducted.

EXAMPLE 2

A functional group-modification on the pressure-sensitive adhesive surface was conducted in the same manner as in Example 1 except that an aqueous solution of polyallylamine [PAA-10L-10C, trade name, made by Nitto Boseki Co., Ltd., (molecular weight: 100,000)] was used in place of the aqueous solution of polyethyleneimine.

EXAMPLE 3

A functional group-modification on the pressure-sensitive surface was conducted in the same manner as in Example 1 except that an aqueous solution of polyvinylamine [PVAM0595B, tradename, made by Mitsubishi Chemical Corporation, (molecular weight: 600,000)] was used in place of the aqueous solution of polyethyleneimine.

COMPARATIVE EXAMPLE 1

After allowing to stand the pressure-sensitive tape obtained in Reference Example 1 for 4 days or longer at room temperature and confirming the deactivation of the isocyanate group in the pressure-sensitive adhesive, the pressure-sensitive tape was immersed in an aqueous solution of polyethyleneimine and pulled out as in Example 1. After drying off water as in Example 1, the pressure-sensitive tape was allowed to stand at room temperature such that the surface of the pressure-sensitive adhesive did not touch other substances, whereby a functional group-modification on the pressure-sensitive adhesive surface was conducted.

COMPARATIVE EXAMPLE 2

A functional group-modification on the pressure-sensitive adhesive surface was conducted in the same manner as in Comparative Example 1 except that the same aqueous polyallylamine solution as in Example 2 was used in place of the aqueous solution of polyethyleneimine.

COMPARATIVE EXAMPLE 3

A functional group-modification was conducted in the same manner as in Comparative Example 1 except that the same aqueous polyvinylamine solution as in Example 3 was used in place of the aqueous solution of polyethyleneimine.

EXAMPLE 4

With an acrylic pressure-sensitive adhesive solution was mixed a tri-functional acid chloride compound ("Trimesoyl Chloride", made by Aldrich Chemical Co.) such that the solid content thereof was 1.28 parts per 100 parts of the solid content of the pressure-sensitive adhesive solution. The mixture was coated on a polyester film and dried in the same manner as in Reference Example 1 to prepare a pressure-sensitive tape. The pressure-sensitive tape was immersed in the same aqueous solution of polyallylamine as in Example 2 before the carbonyl chloride group was not deactivated and then pulled up in the perpendicular direction at a speed of 4 cm/minute. After drying off water attached to the pressure-sensitive tape, the tape was allowed to stand at room temperature such that the surface of the pressure-sensitive adhesive did not touch other substances, whereby a functional group-modification on the pressure-sensitive adhesive surface was conducted.

EXAMPLE 5

A functional group-modification was conducted in the same manner as in Example 4 except that the same aqueous solution of polyvinylamine as in Example 3 was used in place of the aqueous solution of polyallylamine.

About each of the pressure-sensitive tapes obtained in Reference Example 1, Examples 1 to 5, and Comparative Examples 1 to 3 described above as a sample, the ratio of elements constituting the surface of the pressure-sensitive adhesive were analyzed by XPS (X-ray Photoelectron Spectroscopy) under the following conditions. Results are shown in Table 1 below.

<XPS Analysis Condition>

Apparatus: Simadzu/Kratos Axis-HSi

X-Ray source: Al-Kα line (monochrometer used)

Output 150 W (acceleration voltage 15 kV)

Photoelectron take out angle: 90 degree to sample surface

Analyzed area: 300 $\mu$m×700 $\mu$m

TABLE 1

|  | C (atomic %) | O (atomic %) | N (atomic %) |
|---|---|---|---|
| Reference Example 1 | 75.0 | 22.9 | 0.2 |
| Example 1 | 68.4 | 19.6 | 12.0 |
| Example 2 | 69.1 | 21.8 | 9.1 |
| Example 3 | 68.5 | 21.7 | 9.8 |
| Example 4 | 71.1 | 23.7 | 4.0 |
| Example 5 | 69.9 | 24.1 | 4.7 |

TABLE 1-continued

|  | C (atomic %) | O (atomic %) | N (atomic %) |
|---|---|---|---|
| Comparative Example 1 | 75.9 | 23.1 | 1.0 |
| Comparative Example 2 | 75.4 | 22.5 | 0.7 |
| Comparative Example 3 | 75.4 | 22.3 | 1.3 |

Figure 2:
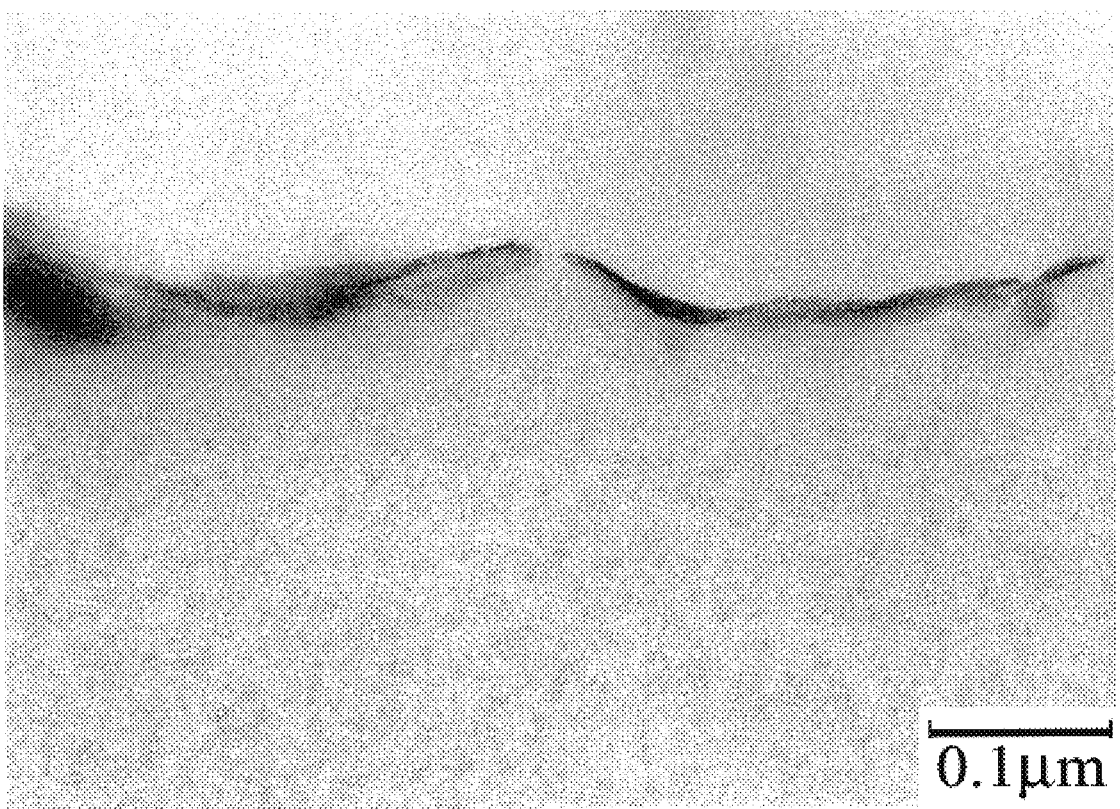
FIG. 2 is a photograph (250,000 magnifications) by TEM showing the sectional structure of the portion near the surface of the pressure-sensitive adhesive layer of the pressure-sensitive tape of Example 2.
Figure 3:
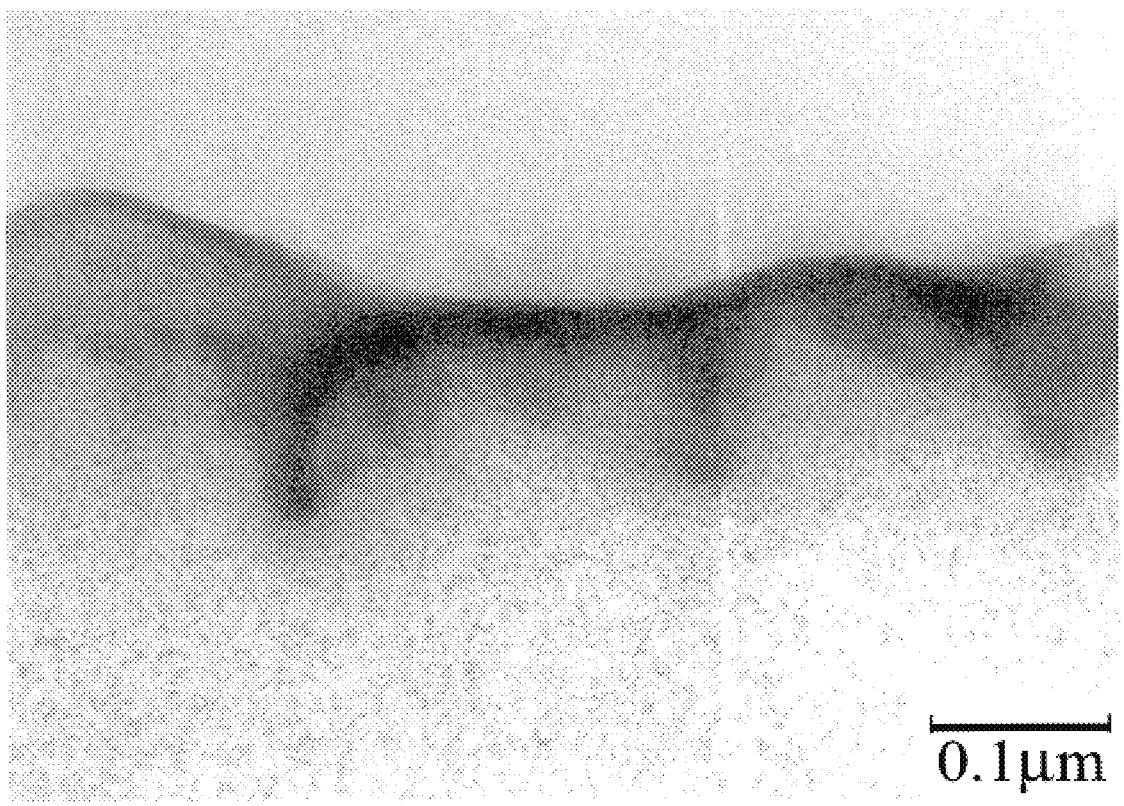
FIG. 3 is a photograph (250,000 magnifications) by TEM showing the sectional structure of the portion near the surface of the pressure-sensitive adhesive layer of the pressure-sensitive tape of Example 3.
Figure 4:
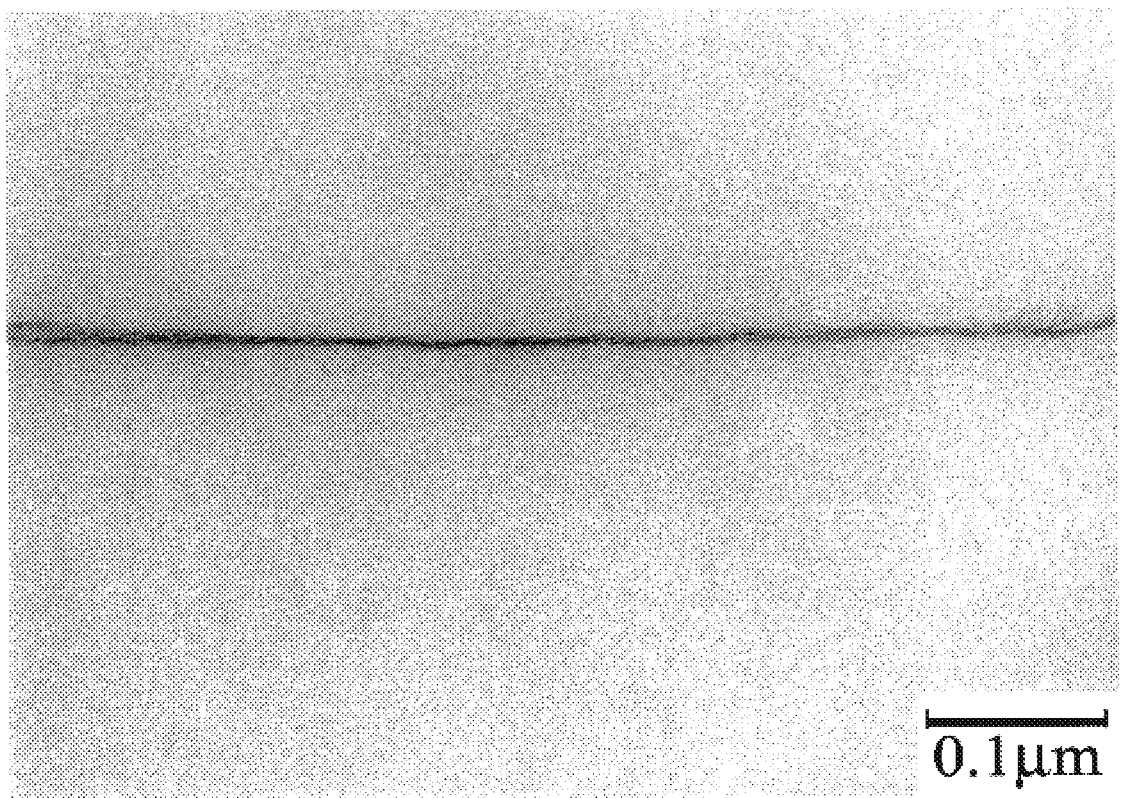
FIG. 4 is a photograph (250,000 magnifications) by TEM showing the sectional structure of the portion near the surface of the pressure-sensitive adhesive layer of the pressure-sensitive tape of Example 4.
Figure 5:
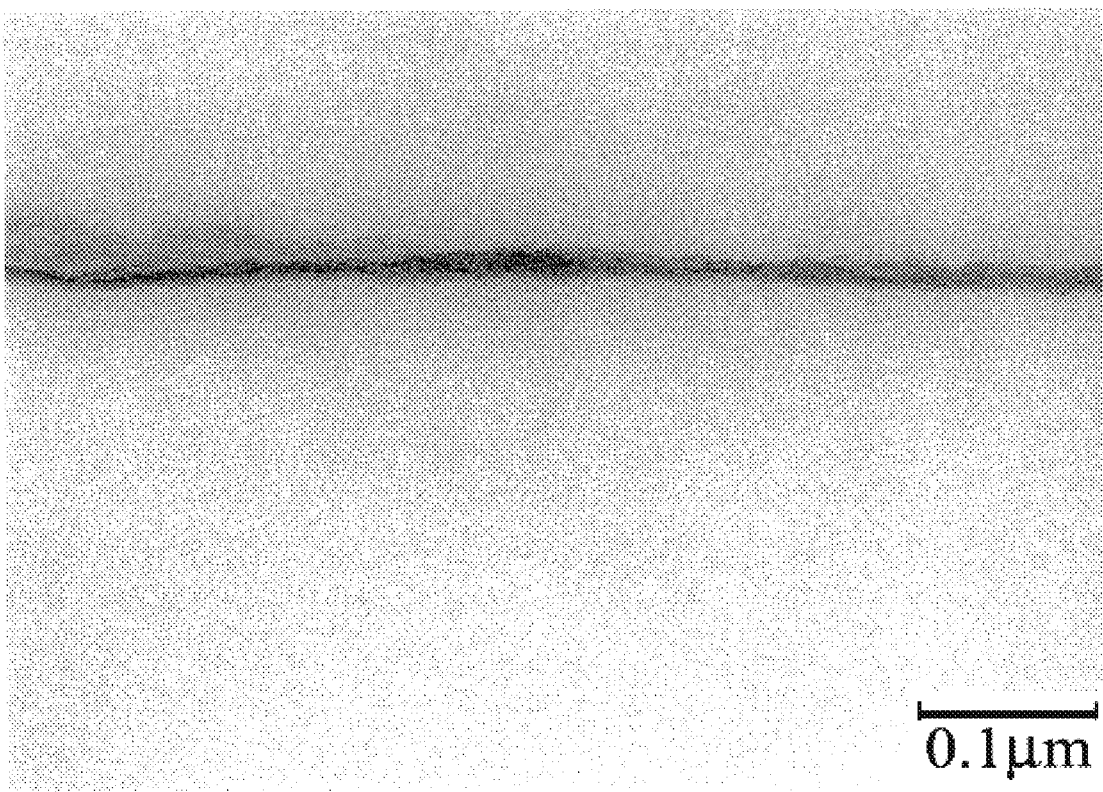
FIG. 5 is a photograph (250,000 magnifications) by TEM showing the sectional structure of the portion near the surface of the pressure-sensitive adhesive layer of the pressure-sensitive tape of Example 5.
Figure 6:
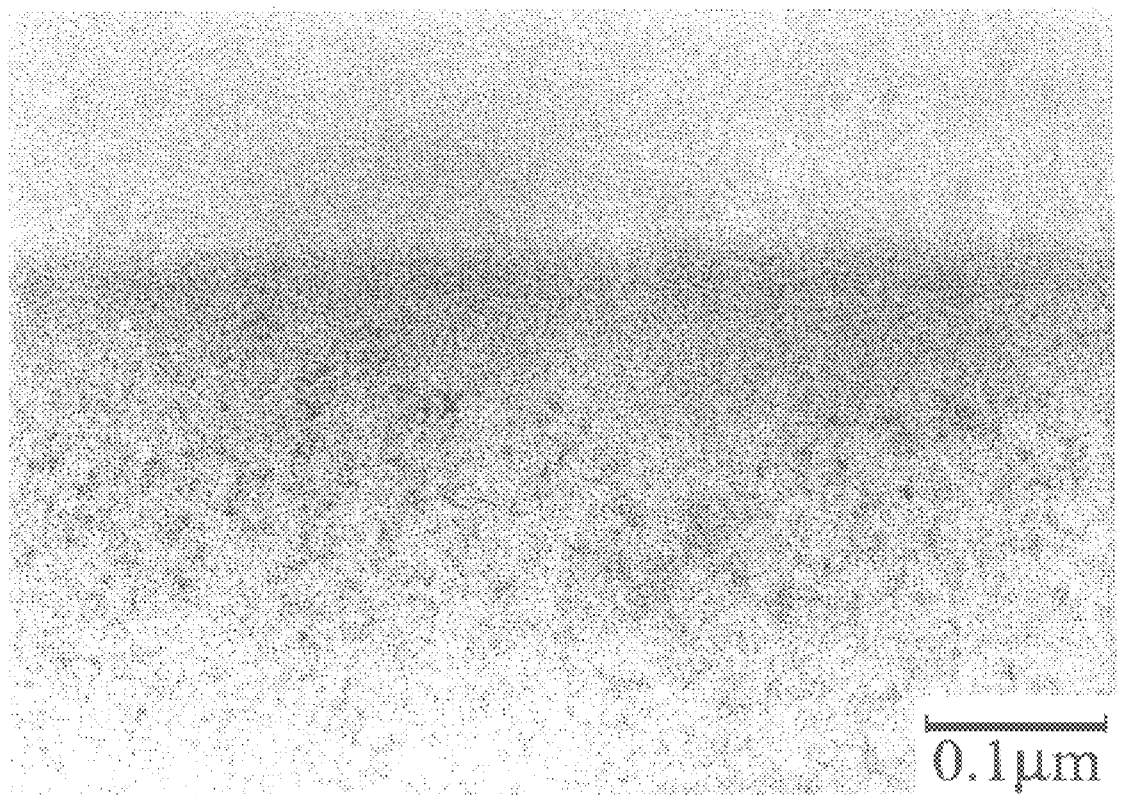
FIG. 6 is a photograph (250,000 magnifications) by TEM showing the sectional structure of the portion near the surface of the pressure-sensitive adhesive layer of the pressure-sensitive tape of Comparative Example 1.

Also, about each of the pressure-sensitive tapes obtained in Examples 1 to 5 and Comparative Example 1 as a sample, the sectional observation of the portion near the surface of the pressure-sensitive adhesive was carried out by TEM (Transmission Electron Microscopy) according to the following method. The results are shown in FIG. 1 to FIG. 6.

<Sectional observation of portion near the surface of pressure-sensitive adhesive by TEM>

For the purpose of clarifying the reduction in damage of each sample by irradiation with electron rays and the existence of a phase structure, after applying a dyeing treatment with ruthenium tetaoxide to the sample (the pressure-sensitive tape sample was exposed onto an aqueous solution of 2 wt % ruthenium tetraoxide for from 1 to 1.5 hours), the sample was enveloped in an epoxy resin and by a super-thin cut piece method, a sectional TEM observation (apparatus: Hitachi, H-800, acceleration voltage: 100 kV) was carried out. Because in the observation, the portion having a high concentration of a polar functional group such as an amino group is strongly dyed, the existence of the above-described functional group can be confirmed.

Then, about each of the pressure-sensitive tapes obtained in Examples 1 to 3 and Reference Example 1 described above as a sample, the 180 degree peel strength to the surface of an unsaturated polyester varnish-coated plate was measured by the following method. The results are shown in Table 2.

In addition, in the test, to avoid the influence of the isocyanate compound compounded in the pressure-sensitive adhesive, the pressure-sensitive tape sample was allowed to stand at room temperature for 4 days or longer since the preparation thereof and after confirming by infrared absorption that the isocyanate group was vanished and deactivated, the sample was adhered to the surface of the coated plate.

<Measurement method of 180 degree peel strength to the surface of coated plate>

On the surface of a tin-plated iron plate was coated "Polyester varnish NV-543 liquid" made by NITTO DENKO CORPORATION and the coated plate was heated in an oven of 120° C. for 1.5 hours to cure the coated layer. Onto the surface of the coated plate was adhered the pressure-sensitive tape sample cut into a width of 20 mm and was press-adhered thereto by reciprocating once a rubber roller of 2 kg in weight. After placing the assembly in a vessel kept at a constant temperature of 50° C. for 5 days, the assembly was taken out therefrom, and after allowing to stand the assembly in a chamber kept at a constant temperature of 23° C. for 30 minutes or longer, the 180 degree peel strength was measured by Schopper's tensile tester at a peeling speed of 300 mm/minute.

In addition, in Table 2 below, (*) shows that because the adhesive force to the surface of the coated plate was too strong, at the time of showing the value of 2,000 g/20 mm-width, an anchoring failure occurred at the interface between the polyester film which was the substrate of the pressure-sensitive tape and the pressure-sensitive adhesive layer.

TABLE 2

|  | 180 Degree Peeling Strength (g/20 mm width) |
|---|---|
| Example 1 | >2,000 (*) |
| Example 2 | 1,800 |
| Example 3 | 1,300 |
| Reference Example 1 | 1,050 |

As is clear from the results of Table 1 described above and FIGS. 1 to 6, in each of the pressure-sensitive tapes of Examples 1 to 5, wherein the functional group-modification on the pressure-sensitive adhesive surface was carried out by the method of the present invention, the ratio of the N atom as the constituting element was very high (Table 1) and the dyed layer based on the existence of an amino group could be clearly confirmed in the observation by TEM (FIGS. 1 to 5). From these results, it can be seen that in each of the pressure-sensitive tapes of Examples 1 to described above, an amino group is fixed at a high density to the surface of the pressure-sensitive adhesive. Also, as is clear from the results of the peeling strength test shown in Table 2, as a result that an amino group is fixed at a high density to the surface of the pressure-sensitive adhesive as described above, it can be seen that in the pressure-sensitive tapes of the present invention obtained in Examples 1 to 3, the adhesive strength to the surface of the unsaturated polyester varnish-coated plate is largely improved.

REFERENCE EXAMPLE 2

With the SIS-based pressure-sensitive adhesive solution was mixed a tri-functional aziridine compound, [2,2-bishydroxymethylbutanol-tris[3-(aziridinyl)propionate] (Chemitite PZ-33, trade name, made be Nippon Shokubai Co., Ltd.) such that the solid content thereof was 2 parts per 100 parts of the solid content of the pressure-sensitive adhesive solution and by coating the mixture on a polyester film and dried as in Reference Example 1, a pressure-sensitive tape was prepared. The pressure-sensitive tape was allowed to stand at room temperature such that the surface of the pressure-sensitive adhesive did not touch other substances.

EXAMPLE 6

The pressure-sensitive tape obtained in Reference Example 2 was immersed in an aqueous solution containing 1 g of polyacrylic acid (made by Wako Pure Chemical Industries, Ltd.) in 1,000 ml of water before the aziridinyl group contained in the pressure-sensitive adhesive was not decativated, and after allowing to stand for 10 minutes, the pressure-sensitive tape was pulled up. After drying off water attached to the pressure-sensitive tape, the tape was allowed to stand at room temperature such that the surface of the pressure-sensitive adhesive did not touch other substances to carry out the functional group-modification on the pressure-sensitive adhesive surface.

About each of both the pressure-sensitive tapes of Reference Example 2 and Example 6 described above as a sample, the constitution ratio of a

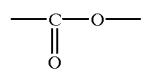

group on the surface of the pressure-sensitive adhesive was determined by the wave analysis of the C1s spectrum [G. Beamson and D. Briggs, "High Resolution XPS of Organic Polymers", John Wiley & Sons, New York (1992)].

The results are shown in Table 3 below. In addition, in the table, the numeral in [ ] shows the bond energy value (eV) of each peak.

TABLE 3

| | Peak Constitution Ratio (%) | | | | |
|---|---|---|---|---|---|
| | $\underline{C}H_n$ | $\underline{C}{=}C{=}O$ $\underline{C}{-}N{-}$ | $\underline{C}{-}O$ | $O{=}\underline{C}{-}O$ | Shake up |
| Ex. 6 | 50.9 [284.8] | 31.0 [286.0] | | 18.1 [288.6] | — |
| Ref. Ex. 2 | 73.1 [285.8] | 17.2 [285.0] | 6.0 [286.7] | 2.6 [289.4] | 1.1 [291.5] |

Ex.: Example
Ref. Ex: Reference Example

As is clear from the results shown in above-described Table 3, it can be seen that in the pressure-sensitive tape of Example 6 subjected to the functional group modification on the surface of the pressure-sensitive adhesive by the method of the present invention, the constitution ratio of the peak belonging to the molecular structure of a carboxyl group at the surface of the pressure-sensitive adhesive becomes a high value, whereby the carboxyl group is fixed at a high density to the surface of the pressure-sensitive adhesive.

EXAMPLE 7

The pressure-sensitive tape obtained in Reference Example 1 was immersed in an aqueous solution containing 0.2 g of polyallylamine [PAA-10C, trade name, made by Nitto Boseki Co., Ltd., (molecular weight: 10,000)] in 1,000 ml of water before the isocyanate group in the pressure-sensitive adhesive was not deactivated (within 6 hours) and thereafter, the tape was pulled up in the perpendicular direction at a speed of 4 cm/minute. After drying off water attached to the pressure-sensitive tape, the tape was allowed to stand at room temperature such that the surface of the pressure-sensitive adhesive did not touch other substances.

When about the pressure-sensitive tape having fixed to the surface of the pressure-sensitive adhesive an amino group as a functional group as described above, the constitution element ratios of the surface of the pressure-sensitive adhesive were analyzed by XPS by the method and the condition same as in Examples 1 to 5, C was 71.5 atomic %, O 17.1 atomic %, and N 10.6 atomic %, and the ratio of the N atom as the constitution element became very high. Also, when the sectional observation of the portion near the surface of the pressure-sensitive adhesive was carried out by TEM by the method and the condition as in Examples 1 to 5, the result almost near FIG. 2 (Example 2) was obtained and the dyed layer based on the amino group could be confirmed. From these results, it has been found that in the above-described pressure-sensitive tape, an amino group is fixed at a high density to the surface of the pressure-sensitive adhesive.

Then, after allowing to stand the above-described pressure-sensitive tape having fixed to the surface of the pressure-sensitive adhesive the amino group as a functional group for 4 days at room temperature (the amino group kept the activity), the pressure-sensitive tape was immersed in an aqueous solution containing 2 g of γ-glycidoxypropyl trimethoxysilane shown by the following chemical formula

[silane coupling agent, KBM-403, trade name, made by Shin-Etsu Chemical Co., Ltd.] in 1000 ml of water for 30 minutes and thereafter, the pressure-sensitive tape was pulled up and washed with water. After drying off water attached to the pressure-sensitive tape, the tape was allowed to stand at room temperature such that the surface of the pressure-sensitive adhesive did not touch other substances to carry out the functional group modification on the pressure-sensitive adhesive surface.

COMPARATIVE EXAMPLE 4

After allowing to stand the pressure-sensitive tape obtained in Reference Example 1 for 4 days at room temperature and confirming that the isocynate group in the pressure-sensitive adhesive was deactivated, the pressure-sensitive tape was immersed in the aqueous solution containing γ-glycidoxypropyl trimethoxysilane as in Example 7, pulled up, and washed with water. After drying off water attached to the pressure-sensitive tape as in Example 7, the pressure-sensitive tape was allowed to stand at room temperature such that the surface of the pressure-sensitive adhesive did not touch other substances to carry out a functional group modification on the surface of the pressure-sensitive adhesive.

COMPARATIVE EXAMPLE 5

After allowing to stand the pressure-sensitive tape obtained in Reference Example 1 for 4 days at room temperature and confirming that the isocyanate group in the pressure-sensitive adhesive was deactivated, the pressure-sensitive tape was immersed in an aqueous solution containing 2 g of N-β(aminoethyl) γ-aminopropyltrimethoxysilane shown by the following chemical formula

[silane coupling agent, KBM-603, trade name, made by Shin-Etsu Chemical Co., Ltd.) in 1,000 ml of water for 30 minutes. Thereafter, the pressure-sensitive tape was pulled up and washed with water. After drying off water attached to the pressure-sensitive tape, the tape was allowed to stand at room temperature such that the surface of the pressure-sensitive adhesive did not touch other substances to carry out a functional group modification on the surface of the pressure-sensitive adhesive.

Using each of the pressure-sensitive tapes of Example 7 and Comparative Examples 4 and 5 described above and the pressure-sensitive tape of Reference Example 1 described hereinbefore as a sample, the 180 degree peel strength to the surface of a glass plate was measured by the following method. The results are as shown in Table 4 below. In addition, in the test, about the pressure-sensitive tape of Reference Example 1, to avoid the influence of the isocyanate group mixed in the pressure-sensitive adhesive, after allowing to stand the sample at room temperature for 4 days or longer since the preparation thereof and confirming that the isocyanate group was vanished and deactivated by the infrared absorption, the sample was stuck to the surface of a glass plate.

<Measurement method of 180 degree peel strength to the surface of glass plate>

On the surface of a glass plate was stuck the pressure-sensitive tape sample cut into a width of 20 mm at room temperature and was press-adhered thereto by reciprocating once a rubber roller of 2 kg in weight. After placing the assembly in a vessel kept at a constant temperature of 50° C. for 5 days, the assembly was took out therefrom, and after allowing to stand the assembly in a chamber kept at a constant temperature of 23° C. for 30 minutes or longer, the 180 degree peel strength was measured by Schopper's tensile tester at a peeling speed of 300 mm/minute.

In addition, in Table 4 below, (*) shows that because the adhesive force to the surface of the glass plate was too strong, at the time of showing the value of 2,500 g/20 mm-width, an anchoring failure occurred at the interface between the polyester film which was the substrate of the pressure-sensitive tape and the pressure-sensitive adhesive layer.

TABLE 4

|  | 180 Degree peel strength (g/20 mm width) |
| --- | --- |
| Example 7 | >2,500 (*) |
| Ref. Example 1 | 910 |
| Comp. Example 4 | 1,580 |
| Comp. Example 5 | 920 |

Ref.: Reference
Comp.: Comparative

As is clear from the results shown in Table 4, it can be seen that in the pressure-sensitive tape of Example 7, wherein an amino group was previously fixed to the surface of the pressure-sensitive adhesive as a functional group and further an alkoxysilyl group was introduced and fixed to the surface of the presser-sensitive adhesive by the reaction with the amino group, the adhesive strength to the surface of the glass plate was greatly improved by that the surface of the pressure-sensitive adhesive was more effectively improved by the alkoxysilyl group, as compared with the pressure-sensitive tape of Reference Example 1 and the pressure-sensitive tapes of Comparative Examples 4 and 5, wherein the introduction and fixation of an alkoxysilyl group were tried by other methods than the method of Example 7.

EXAMPLE 8

According to the method of Example 7, after allowing to stand the pressure-sensitive tape having an amino group as a functional group fixed to the surface of the pressure-sensitive adhesive for 4 days at room temperature (the activity of the amino group was maintained), the pressure-sensitive tape was immersed in a n-hexane solution containing 2 g of methacryloyl chloride represented by the chemical formula: $H_2C=C(CH_3)COCl$ (made by Aldrich Chemical Co.) in 1,000 ml thereof for 20 minutes. Thereafter, the pressure-sensitive tape was pulled up and washed with n-hexane. After drying off n-hexane attached to the pressure-sensitive tape, the tape was allowed to stand at room temperature such that the surface of the pressure-sensitive adhesive did not touch other substances. Thus, the functional group modification on the surface of the pressure-sensitive adhesive was carried out.

COMPARATIVE EXAMPLE 6

After allowing to stand the pressure-sensitive tape obtained in Reference Example 1 for 4 days or longer at room temperature and confirming that the isocyanate group in the pressure-sensitive adhesive was deactivated, the pressure-sensitive tape was immersed in the n-hexane solution containing methacryloyl chloride as in Example 8, pulled up, and washed with n-hexane. After drying off n-hexane as in Example 8, the pressure-sensitive tape was allowed to stand at room temperature such that the surface of the pressure-sensitive adhesive did not touch other substances to carry out a functional group modification of the surface of the pressure-sensitive adhesive.

Then, using each of the pressure-sensitive tapes obtained in Example 8, Comparative Example 6 described above and Reference Example 1 described hereinbefore as a sample, the 180 degree peel strength to the surface of an unsaturated polyester varnish-coated plate was measured by the following method. The results are shown in Table 5.

In addition, in the test, to avoid the influence of the isocyanate compound compounded in the presser-sensitive adhesive, the pressure-sensitive tape sample was allowed to stand at room temperature for 4 days or longer since the preparation thereof and after confirming by infrared absorption that the isocyanate group was vanished and deactivated, the sample was stuck to the surface of the coated plate.

<Measurement method of 180 degree peel strength to the surface of coated plate>

On the surface of a tin-plated iron plate was coated "Polyester varnish NV-543 liquid" made by NITTO DENKO CORPORATION and the coated plate was heated in an oven of 110° C. for 1 hour to cure the coated layer. Onto the surface of the coated plate was adhered the pressure-sensitive tape sample cut into a width of 20 mm and was press-adhered thereto by reciprocating once a rubber roller of 2 kg in weight. After placing the assembly in a vessel kept at a constant temperature of 110° C. for 1 hour, the assembly was took out therefrom, and after allowing to stand the assembly in a chamber kept at a constant temperature of 23° C. for 30 minutes or longer, the 180 degree peel strength was measured by Schopper's tensile tester at a peeling speed of 300 mm/minute.

In addition, in Table 5 below, (*) shows that because the adhesive force to the surface of the coated plate was too strong, at the time of showing the value of 2,500 g/20 mm-width, an anchoring failure occurred at the interface between the polyester film which was the substrate of the pressure-sensitive tape and the pressure-sensitive adhesive layer.

TABLE 5

|  | 180 Degree Peel Strength (g/20 mm width) |
| --- | --- |
| Example 8 | >2,500 (*) |
| Ref. Example 1 | 1,200 |
| Comp. Example 6 | 1,180 |

Ref.: Reference
Comp.: Comparative

As is clear from the results shown in Table 5, it can be seen that in the pressure-sensitive tape of Example 8, wherein an amino group was previously fixed to the surface of the pressure-sensitive adhesive as a functional group and further a vinyl group was introduced and fixed to the surface of the presser-sensitive adhesive by the reaction with the amino group, the adhesive strength to the surface of the unsaturated polyester varnish-coated plate was greatly improved by that the surface of the pressure-sensitive adhesive was more effectively improved by the vinyl group, as compared with the pressure-sensitive tape of Reference Example 1 and the pressure-sensitive tape of Comparative Example 6, wherein the introduction and fixation of a vinyl group were tried by other methods than the method of Example 8.

EXAMPLE 9

According to the method of Example 7, after allowing to stand the pressure-sensitive tape having fixed an amino group as a functional group to the surface of the pressure-sensitive adhesive for 4 days at room temperature, the pressure-sensitive tape was immersed in a n-hexane solution containing 2 g of polydimethylsiloxane containing an epoxy group at one terminal shown by the following chemical formula

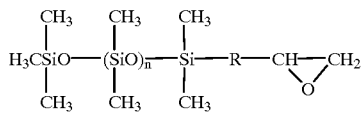

[X-22-173DX, trade name, made by Shin-Etsu Chemical Co., Ltd., (molecular weight: 4.500)] in 1,000 ml thereof for 30 minutes. Thereafter, the pressure-sensitive tape was pulled out and washed with n-hexane. After drying off n-hexane attached to the pressure-sensitive tape, the tape was allowed to stand at room temperature such that the surface of the pressure-sensitive adhesive did not touch other substances. Thus, the functional group modification of the surface of the pressure-sensitive adhesive was carried out.

COMPARATIVE EXAMPLE 7

After allowing to stand the pressure-sensitive tape obtained in Reference Example 1 for 4 days or longer at room temperature and confirming that the isocyanate group in the pressure-sensitive adhesive was deactivated, the pressure-sensitive tape was immersed in the n-hexane solution containing polydimethylsiloxane containing an epoxy group at one terminal as in Example 9, pulled out, and washed with n-hexane. After drying off n-hexane as in Example 9, the pressure-sensitive tape was allowed to stand at room temperature such that the surface of the pressure-sensitive adhesive did not touch other substances to carry out a functional group modification on the surface of the pressure-sensitive adhesive.

EXAMPLE 10

According to the method of Example 7, after allowing to stand the pressure-sensitive tape having an amino group as a functional group fixed to the surface of the pressure-sensitive adhesive for 4 days at room temperature, the pressure-sensitive tape was immersed in a n-hexane solution containing 1 g of octadecyl isocyanate shown by the following chemical formula;

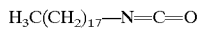

(made by Aldrich Chemical Co.) in 1,000 ml thereof for 5 minutes. Thereafter, the pressure-sensitive tape was pulled up and washed with n-hexane. After drying off n-hexane attached to the pressure-sensitive tapes, the tape was allowed to stand at room temperature such that the surface of the pressure-sensitive adhesive did not touch other substances. Thus, the functional group modification on the surface of the pressure-sensitive adhesive was carried out.

About each of the pressure-sensitive tapes obtained in Examples 9 and 10 and Comparative Example 7 described above and the pressure-sensitive tape of Reference Example 1 described hereinbefore as a sample, the 180 degree peel strength to the surface of a stainless steel plate was measured by the method shown below. The results are shown in Table 6. In addition, in the test, to avoid the influence of the isocyanate compound mixed in the pressure-sensitive adhesive, the pressure-sensitive tape sample of Reference Example 1 was allowed to stand at room temperature for 4 days or longer since the preparation thereof and after confirming by the infrared absorption that the isocyanate compound in the pressure-sensitive adhesive was vanished and deactivated, the sample was stuck to the surface of a stainless steel plate.

<Measurement method of 180 degree releasing strength to the surface of stainless steel plate>

To the surface of a stainless steel plate (SUS 304BA plate) was adhered each pressure-sensitive tape plate cut into a width of 20 mm in a room kept at a constant temperature of 23° C. and was press-adhered thereto by reciprocating once a rubber roller of 2 kg in weight. After allowing to stand the assembly for 30 minutes or longer, the 180 degree peel strength was measured by Schopper's tensile tester at a peeling speed of 300 mm/minute.

TABLE 6

| | 180 Degree Peel Strength (g/20 mm width) |
|---|---|
| Example 9 | 10 |
| Example 10 | 30 |
| Reference Example 1 | 630 |
| Comparative Example 7 | 640 |

As is clear from the results of above-described Table 6, it can be seen that in the pressure-sensitive tapes of Examples 9 and 10, wherein an amino group was previously fixed to the surface of the pressure-sensitive adhesive as a functional group and a polydimethylsiloxane group or a long-chain alkyl group was introduced and fixed to the surface of the pressure-sensitive adhesive by the reaction with the amino group, the releasing property (light releasing property) to the surface of the stainless steel plate is largely improved by that the surface of the pressure-sensitive adhesive is effectively improved by the polydimethylsiloxane group or the long-chain alkyl group, as compared with the pressure-sensitive tape of Reference Example 1 described above and the pressure-sensitive tape of Comparative Example 7, wherein the polydimethylsiloxane group was tried to be introduced and fixed by other method than those of Examples 9 and 10.

INDUSTRIAL APPLICABILITY

As described above, in the present invention, by performing fixing of a functional group to the surface of the pressure-sensitive adhesive by an interfacial contact reaction between the pressure-sensitive adhesive phase and the phase containing a functional group-containing compound, a desired functional group can be stably introduced at high density to the surface of the pressure-sensitive adhesive, and according to the method, the conventional problems that the fluid characteristics and the adhesive characteristics of the adhesive are reduced and the surface of the adherend is stained by a bleed out do not occur, and also the fixing strength of the functional group to the surface of the adhesive is large, whereby there is no possibility that the above-described functional group is easily released by a friction, etc.

What is claimed is:

1. A method of forming a pressure-sensitive adhesive product having improved adhesion, comprising:
   providing a pressure-sensitive adhesive layer on a substrate, said adhesive layer comprising a compound having at least one reactive functional group, said compound being added to said adhesive layer either before or after said adhesive layer is provided on said substrate, then during a time when said at least one reactive functional group is in a reactive state, contacting the exposed surface of said adhesive layer with a liquid or gaseous phase comprising a functional group-containing compound having at least one reactive functional group which is capable of reacting with the at least one reactive functional group of the compound in the adhesive layer, whereby an interfacial contact reaction occurs between the respective functional groups of the adhesive layer and the liquid or gaseous phase compounds, thus forming a functional group-modified phase on the surface of the adhesive layer, said functional group-modified phase having a thickness of 1,000 nm or less.

2. The method as claimed in claim 1, wherein the functional group-containing compound is at least one of polyethyleneimine, polyallylamine, polyvinylamine, and polyacrylic acid.

3. A method as claimed in claim 1, which further comprises, after fixing a functional group to the surface of the pressure-sensitive adhesive, causing an interfacial contact reaction of other functional group-containing compound with the functional group to fix said other functional group to the surface of the pressure-sensitive adhesive.

4. The method as claimed in claim 1, wherein the thickness of the functional group-modified phase is 100 nm or less.

5. The method as claimed in claim 1, wherein a solvent, which does not dissolve or swell the pressure-sensitive adhesive surface and a functional group-containing compound are used in conducting the interfacial contact reaction.

6. The method as claimed in claim 1, wherein the reactive state is between one day and three months after the compound is added to the adhesive layer.

* * * * *